(12) United States Patent
Iacono

(10) Patent No.: US 10,502,836 B2
(45) Date of Patent: Dec. 10, 2019

(54) INFORMATION DISPLAY SYSTEM

(71) Applicant: Zero Friction, LLC, Oakbrook Terrace, IL (US)

(72) Inventor: John R. Iacono, Elmhurst, IL (US)

(73) Assignee: ZERO FRICTION, LLC, Oakbrook Terrace, IL (US)

( * ) Notice: Subject to any disclaimer, the term of this patent is extended or adjusted under 35 U.S.C. 154(b) by 508 days.

(21) Appl. No.: 15/217,627

(22) Filed: Jul. 22, 2016

(65) Prior Publication Data
US 2018/0021656 A1 Jan. 25, 2018

(51) Int. Cl.
| | |
|---|---|
| *A41D 19/00* | (2006.01) |
| *G01S 19/13* | (2010.01) |
| *A45F 5/02* | (2006.01) |
| *A63B 71/14* | (2006.01) |
| *A63B 57/00* | (2015.01) |
| *G01S 19/19* | (2010.01) |
| *A63B 71/06* | (2006.01) |

(52) U.S. Cl.
CPC .......... *G01S 19/13* (2013.01); *A41D 19/0024* (2013.01); *A41D 19/0037* (2013.01); *A45F 5/02* (2013.01); *A63B 57/00* (2013.01); *A63B 71/146* (2013.01); *G01S 19/19* (2013.01); *A45F 2200/0516* (2013.01); *A45F 2200/0525* (2013.01); *A63B 2071/0661* (2013.01); *A63B 2071/0663* (2013.01); *A63B 2071/0691* (2013.01); *A63B 2209/08* (2013.01); *A63B 2209/10* (2013.01); *A63B 2220/12* (2013.01); *A63B 2220/13* (2013.01); *A63B 2220/14* (2013.01); *A63B 2225/50* (2013.01)

(58) Field of Classification Search
CPC . G01S 19/13; A41D 19/0024; A41D 19/0037; A45F 5/02
See application file for complete search history.

(56) References Cited

U.S. PATENT DOCUMENTS

| | | |
|---|---|---|
| 5,694,261 A | 12/1997 | Deal |
| 5,825,327 A | 10/1998 | Krasner |
| 5,996,116 A | 12/1999 | Tate |
| 6,259,399 B1 | 7/2001 | Krasner |
| 6,582,328 B2 | 6/2003 | Kuta et al. |
| 6,788,200 B1 | 9/2004 | Jamel et al. |
| 7,124,447 B2 * | 10/2006 | Arganese ........... A41D 19/0027 2/160 |
| 7,489,241 B2 | 2/2009 | Miettinen et al. |
| 7,714,709 B1 | 5/2010 | Daniel |

(Continued)

FOREIGN PATENT DOCUMENTS

EP    2750120 A1    7/2014

OTHER PUBLICATIONS

Approach S6 Garmin Golf Watch <https://buy.garmin.com/en-US/US/into-sports/golfing/approach-s6/prod138810.html>.

*Primary Examiner* — Richale L Quinn
(74) *Attorney, Agent, or Firm* — Baker & McKenzie

(57) ABSTRACT

An information display system for a golfer in which a display module in wireless communication with an electronic device, such as a mobile phone with a golf GPS application, is worn by a golfer on the back of a golf glove, so that the golfer can very conveniently check on the golfer's distance to various targets on the golf course. The display module is removeably attached to the glove by at least one releasable connection, such a threaded fastener and/or a magnet.

15 Claims, 5 Drawing Sheets

(56) References Cited

U.S. PATENT DOCUMENTS

| | | |
|---|---|---|
| 7,959,351 B1 | 6/2011 | Thorpe |
| 8,083,360 B2 | 12/2011 | Bartlett |
| 8,245,321 B2 | 8/2012 | Ambrosio et al. |
| 8,253,586 B1 | 8/2012 | Matak |
| 8,562,165 B2 | 10/2013 | Thompson et al. |
| 8,860,584 B1 | 10/2014 | Matak |
| 8,957,785 B1 | 2/2015 | Matak et al. |
| 8,992,347 B2 | 3/2015 | Moran et al. |
| 9,095,761 B2 | 8/2015 | Trenkle et al. |
| 9,123,216 B2 | 9/2015 | Chang et al. |
| 9,155,349 B2 * | 10/2015 | Madore .............. A43B 3/0078 |
| 9,189,022 B2 | 11/2015 | Burgess |
| 9,195,781 B2 | 11/2015 | Savarese et al. |
| 9,295,295 B2 | 3/2016 | DuChene et al. |
| 2005/0009584 A1 | 1/2005 | Park et al. |
| 2008/0276348 A1 * | 11/2008 | England ............. A63B 71/146 |
| | | 2/161.2 |
| 2010/0062740 A1 | 3/2010 | Ellis et al. |
| 2010/0095427 A1 * | 4/2010 | Romiti ............ A41D 19/01594 |
| | | 2/160 |
| 2010/0271367 A1 | 10/2010 | Vaden et al. |
| 2011/0043496 A1 * | 2/2011 | Ray Avalani ............ B60R 1/00 |
| | | 345/204 |
| 2011/0225703 A1 | 9/2011 | Maple et al. |
| 2013/0269254 A1 * | 10/2013 | Sassatelli ................ B25J 21/02 |
| | | 49/13 |
| 2013/0276206 A1 * | 10/2013 | DuChene ............ A43B 1/0054 |
| | | 2/161.4 |
| 2014/0073376 A1 * | 3/2014 | Noble Nava .......... H04B 1/385 |
| | | 455/575.6 |
| 2016/0008694 A1 | 1/2016 | Griffiths et al. |
| 2018/0021656 A1 * | 1/2018 | Iacono .............. A41D 19/0024 |
| | | 2/160 |

\* cited by examiner

INFORMATION DISPLAY SYSTEM

BACKGROUND

1. Field of the Invention

The present invention relates to a system for conveniently displaying information to a user while playing a game or engaging in exercise, and, in particular, a way of holding a display device to an item of apparel, such as a glove, to provide a user with a convenient way of obtaining data.

2. Description of the Related Art

The use of GPS locating systems for golfers is well known, and a number of suppliers make products available to help golfers determine how far they are from a target, commonly the pin and hole, but also from landing areas, or from a hazard, such as water or sand. Available products include hand-held, stand-alone display modules, such as the Bushnell Neo-Ghost device, see http://bushnellgolf.com/GPS-Rangefinders/NEO-Ghost-Green; units that are worn like a watch, see Garmin's wearable products at https://buy.garmin.com/en-US/US/wearables/c10002-p0.html; products sold by Sky Caddie, see http://web.skygolf.com/en-GB/products/SkyCaddie-SW2; and clip-on units sold under the name Golf Buddy, see http://www.golfbuddyglobal.com/products/VS4.asp?pType=3.

In addition, there a numerous apps for smartphones, examples of which are discussed at http://gps.about.com/od/sportsandfitness/tp/Best_iPhone_Golf_GPS_Apps.htm. An example of a patent that is directed to a method and device which includes a location-determining component to assist a golfer is U.S. Pat. No. 9,095,761 (Trenkle et al).

Patents in the golf glove field include U.S. Pat. No. 7,124,447 (Arganese) which shows a watch and glove combination, and U.S. Publ. No. 2013/0276206 which shows a golf with an magnet used to hold a ferrous ball marker for convenient use by a golfer. In the field of general purpose gloves, U.S. Publ. No. 2011/0043496 (Avalani) shows a display module attached to a glove permanently (glued or stitched) or removeably via a hook and loop fastener strip or suction cups.

Similarly, a number of watch-like systems exist for providing exercise information to a user. EP Patent No. 2,750, 120 A1 is an example. The information displayed may be obtained directly from a user, such as number of steps taken, heart rate and/or body temperature. Alternatively, the exercise data may be positional in nature, such as may be obtained using a cell phone and a location-determining component (e.g., GPS) to provide information on distance traveled or distance to a destination. Separate, hand-held displays for use by golfers can be cumbersome because they need to be accessed from a pocket or a golf cart. Watch-type or wearable information displays are convenient, but require the user to put on an additional item, beyond the golf glove. Thus, there is a need for an information display module small enough to be carried by a golf glove, and attached to the glove in a way that allows the module to be removed and attached onto another or a replacement golf glove.

SUMMARY

The present application describes a golf glove and system for mounting a display module to an item of apparel such as a golf glove, whereby the module is securely but removeably attachable to a back portion of the glove. In one example, two separate attachment techniques are used, including a sleeve on the back of the glove through which a small bolt extends, with the bolt engaging two points on the module to form a hinge connection; and a second magnetically coupled connection that uses a magnet embedded into a strap or other portion of the back of the glove. The advantages of the structures described herein include the ability to securely attach a display module to an item of apparel for convenient viewing, while making the display module removeable, so that it can be attached to another item of apparel. While the system described herein is particularly well suited for use by golfers, it has application for a variety of activities, such as fitness activities and other sports, where it is useful to have information displayed in a convenient way.

DETAILED DESCRIPTION OF THE EMBODIMENTS

Figure 1:
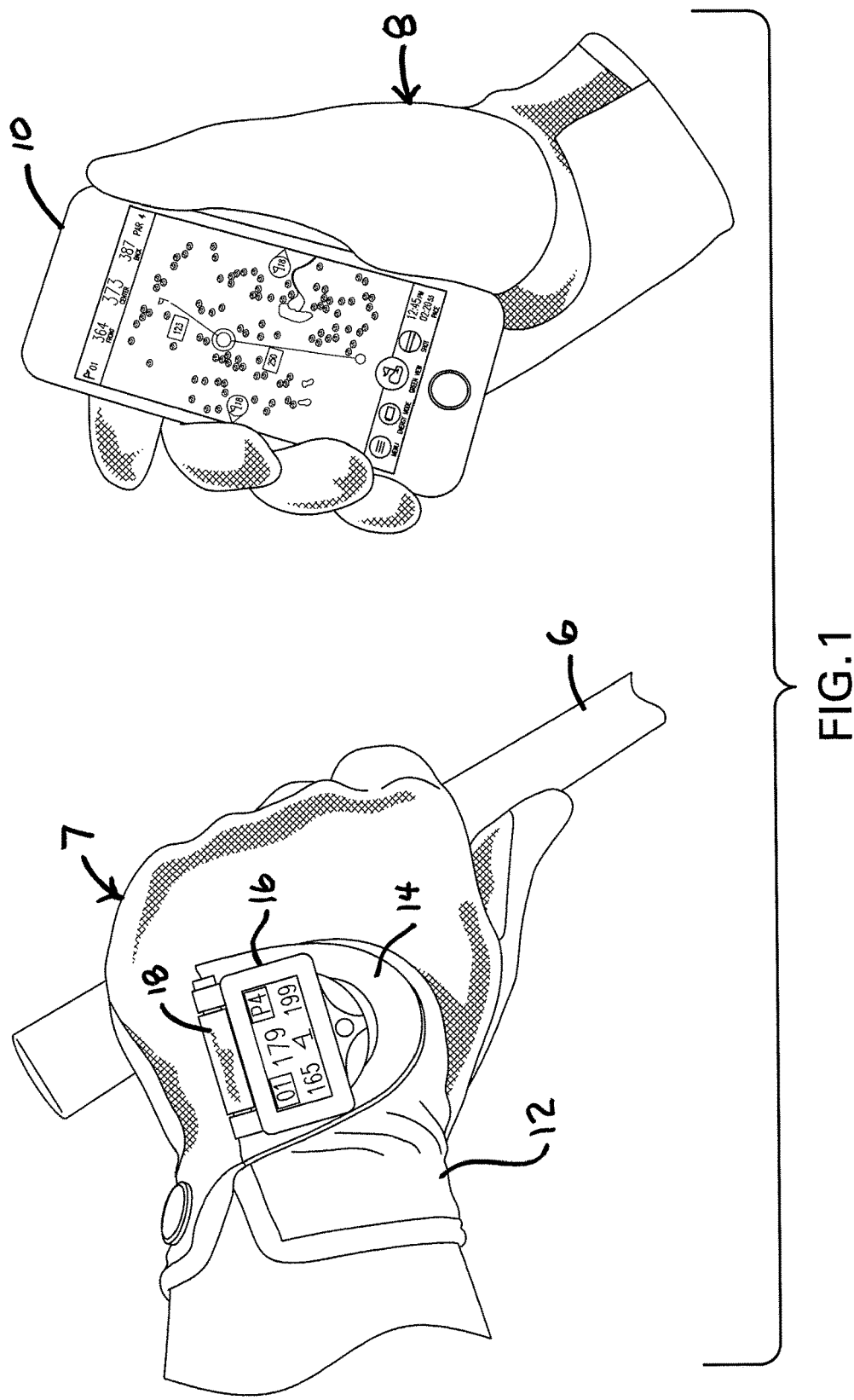
FIG. 1 is a perspective view illustrating an embodiment of an information display system including a base device and a remote display module carried by a golf glove.

FIG. 1 shows a golfer's right hand 8 holding a base telecommunications device in the form of a typical mobile phone 10, which is operating an app and displaying information about a golf course. FIG. 1 also shows a golfer's left hand 7 holding a golf club 6. A glove 12 has a display module 16 attached to the back of the glove 12, and in particular the module 16 is affixed to a strap 14 that employs a hook and loop connection (not shown) to adjustably tighten the glove 12 to the golfer's hand. The display module 16 is in communication with the phone 10 via a wireless communication technology, such as a Bluetooth® system, and a portion of the information about the location of the phone 10 relative to an area of the golf course is visible on the screen 22 of the display module 16. The use of GPS systems to provide golfers with location information based on the golfer's location relative to areas of a golf course is common, and such systems may include software and one or more location-determining components in the base telecommunications device, or in the module itself. The system described herein allows convenient display of location or other information without the need for a user to wear any additional item (such as a separate watch-type band) beyond a glove, since the display module 16 is carried by the back portion of the glove.

Figure 2:
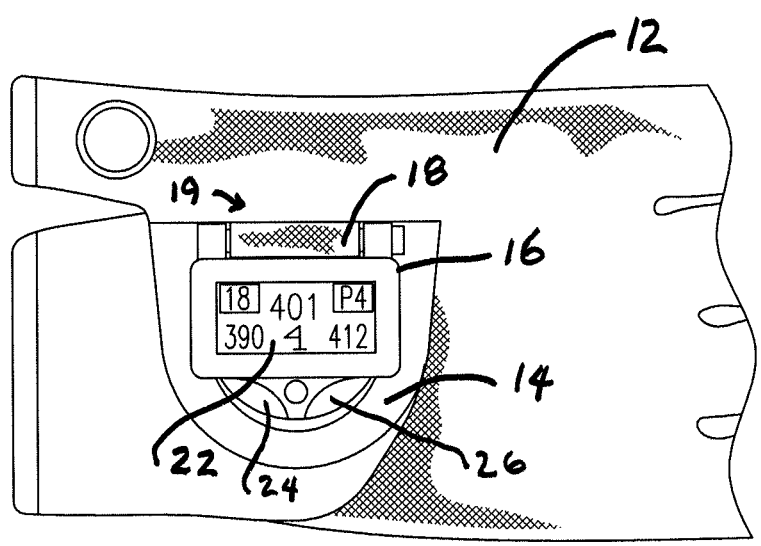
FIG. 2 is a plan view of the display module shown in FIG. 1.

FIG. 2 is a plan view of the upper portion of the glove 12 shown in FIG. 1. The information shown on the screen 22 of the display module 16 is controlled by buttons 24 and 26. The display module 16 is connected to glove 12 in two ways. First, a hinge 19, including a sleeve 18 and hinge pin or bolt 20 is disposed at the base of the strap 14, and is connected to the back of the glove 14. The hinge 19 is comprised of a hinge pin or bolt 20 that passes through the sleeve 18, which is joined to the glove at the intersection of the strap 14 and the back panel 17 of the glove 12. The sleeve 18 is preferably made of fabric, but may be plastic or other material.

Figure 3:
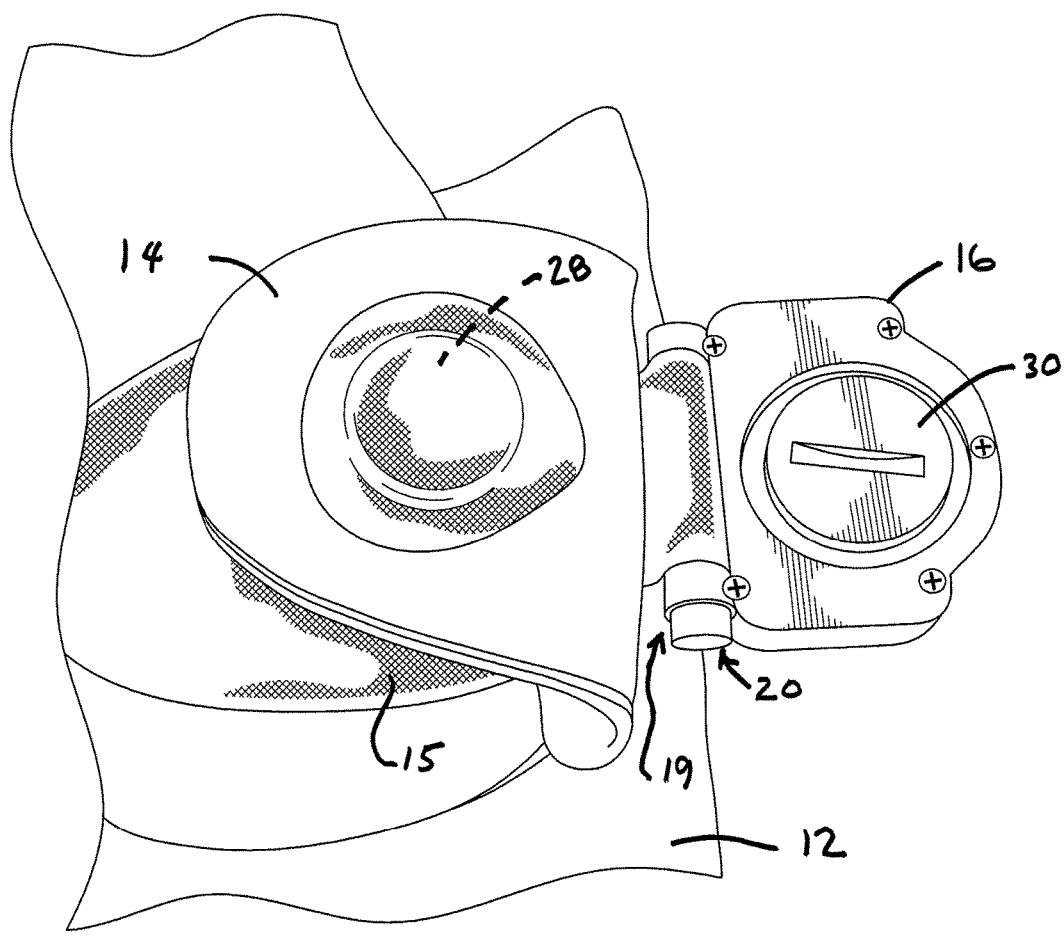
FIG. 3 is a perspective view of the underside of a display module and the portion of the glove to which it is attached.
Figure 4:
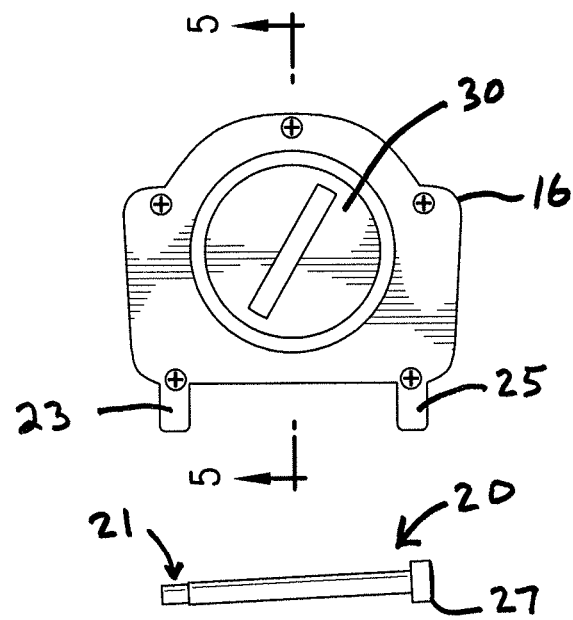
FIG. 4 is an exploded view of display module and a bolt used to connect the module to a glove.
Figure 4:
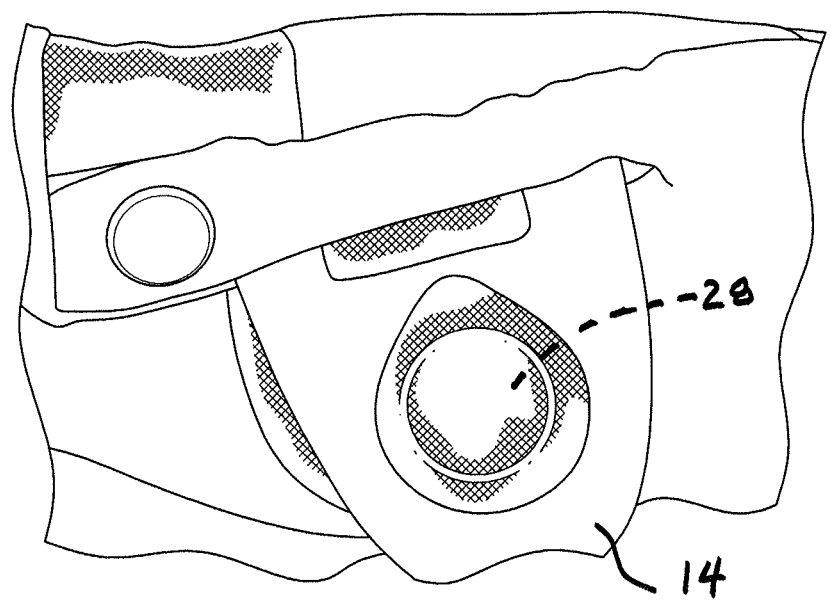
Figure 5:
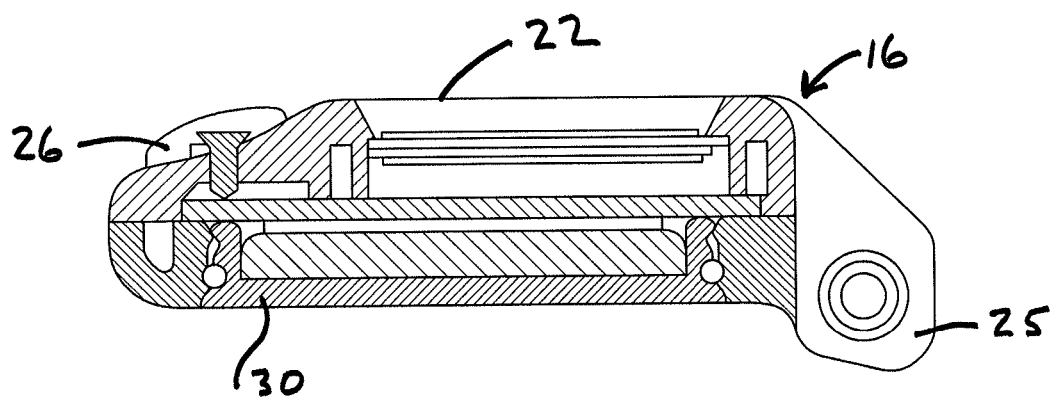
FIG. 5 is a cross-section view of a display module.

FIGS. 3-5 show the details of the two separate connections that are used to hold the display module 16 to the strap 14 of the glove 12. The hinge pin or bolt 20 has threads 21 at one end and an enlarged head 27 at the opposite end. The head 27 preferably has knurls on its exterior to facilitate hand-turning of the hinge pin or bolt 20. In addition the hinge pin or bolt has an drive structure, which is preferably a hex drive, but may be a Phillips, slotted or other drive structure. The hinge pin or bolt 20 extends through an unthreaded bore in the ear 25, then through sleeve 18 and finally into a threaded bore in ear 23. The hinge pin or bolt 20 is then tightened to form a hinge connection 19 between the display module 16 and the glove 12.

A second connection between the display module 16 and the strap 14 is formed by a magnetic couple in which a magnet 28 is sewn into a pocket in the flap 14 and a ferrous piece of material 30 is carried on the underside of the module. The ferrous piece of material 30 may be the rear cover of the module, or may be a separate piece adhered to the rear cover of the module 16. The back 30 of the module is preferably removeable, so that a battery that powers the module 16 can be replaced. When the ferrous back cover 30 of the module 16 is rotated about the hinge pin or bolt 20 into close proximity to the magnet 28, a magnetic coupling occurs due the attractive force between the magnet and the ferrous piece of material 30. Instead of a ferrous back 30, the magnetic couple may include a second magnet affixed to or integral with the rear cover 30 of the module 16, and if the module has a replaceable battery, the magnet integral with the back 30 will likely need to be designed to allow its removal.

While the connections between the module 16 and the glove 12 are intended to be secure, so that they can withstand rapid and jarring movements (such as occurs during a golf swing), the connections are also releasable, so that the module 16 can be used on another glove, for example if a glove becomes wet, damaged or worn out.

While the system for providing information to a person involved in physical activity is shown herein in the context of a golfer being provided with information about the distance between his or her location and a target on the golf course, the mounting and system components and their structures may be used for any of several contexts, such exercise (e.g., heart rate information) and other sporting activities where feedback of various sorts can enhance an experience or improve performance. Other applications include gloves that are used in cycling or fitness adapted to mount a display of information on progress toward a goal in terms of heart rate or travel to or from a location. Still other applications include mounting a display on items of apparel other than a glove, such as a shirt sleeve.

Realization of the information system has been described in the context of a particular embodiment, i.e., a golf glove with a display of information about a golf course. This embodiment is meant to be illustrative and not limiting. Persons of skill in the art will recognize that many variations, modifications, additions, and improvements are possible and may fall within the scope of the inventions as defined in the claims that follow. The inventions claimed below are not intended to be limited to the specific embodiments shown and described above.

What is claimed is:

1. A glove, comprising:
    a glove body;
    a display module configured to display information; and
    a releasable connection configured to releasably couple the glove body and the display module, wherein
    the releasable connection includes a first connector that provides a hinge and a second magnetic connector, the second magnetic connector being distinct from the first connector, and
    the hinge includes a sleeve coupled to the glove body and a pin shaped to fit through the sleeve, the pin being releasably coupled to the display module at at least two connection points.

2. The glove according to claim 1, wherein the magnetic connector includes at least two magnetically attracted components, a first component being a magnet coupled to one of the glove body and the display module, and a second component including ferrous material coupled to an other of the glove body and the display module.

3. The glove according to claim 2, wherein the magnet is sewn into a portion of a back of the glove body, and a bottom portion of the display module includes the ferrous material.

4. The glove according to claim 1, wherein the pin has external threads that engage internal threads formed at one of the connection points of the display module.

5. A glove, comprising:
    a glove body;
    a display module configured to display information; and
    a releasable connection configured to releasably couple the glove body and the display module, wherein
    the releasable connection includes a first releasable connector and a second releasable connector,
    the first releasable connector includes:
        a sleeve coupled to the glove body, and
        an elongated pin shaped to pass through the sleeve,
        the pin having a first part configured to engage a first part of the display module and a second part configured to engage a second part of the display module,
    the second connection includes a magnetically coupleable connection having a first part coupled to the display module and a second part coupled to the glove body.

6. The glove according to claim 1, wherein the glove is a golf glove, and the information includes positional golfing information.

7. The glove according to claim 5, wherein the display module includes a wireless receiver configured to communicate with an electronic device to receive locational information.

8. The glove according to claim 5, wherein the first part of the magnetically coupleable connection includes a ferrous material, and the second part of the magnetically coupleable connection includes a magnet sewn into a pocket on the glove body.

9. The glove according to claim 5, wherein the pin has external threads that engage internal threads disposed at one of the first and second parts of the display module.

10. The glove according to claim 5, wherein the display module is configured to display the information received from a base unit via a wireless connection.

11. The glove according to claim 10, wherein the base unit is a unit includes at least one of a cell phone and a heart rate monitor.

12. The glove according to claim 10, wherein the base unit includes a communication device having a location determining component and a golf course information.

13. The glove according to claim 1, further comprising:
    an electronic device with a location determining component, wherein
    the display module is separate from and capable of wireless communication with the electronic device, and the information includes distance information based on a position of the electronic device relative to a location.

14. The glove according to claim 13, wherein the glove is a golf glove.

15. The glove according to claim 13, wherein the distance information is based on a distance of the electronic component to at least one target on a golf course.

* * * * *